US007586760B2

(12) United States Patent
Chen

(10) Patent No.: US 7,586,760 B2
(45) Date of Patent: Sep. 8, 2009

(54) SNUBBER CAPACITOR RESETTING IN A DC-TO-DC CONVERTER

(75) Inventor: Keming Chen, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 126 days.

(21) Appl. No.: 11/959,003

(22) Filed: Dec. 18, 2007

(65) Prior Publication Data

US 2009/0154205 A1 Jun. 18, 2009

(51) Int. Cl.
*H02M 3/335* (2006.01)
*H02H 7/122* (2006.01)

(52) U.S. Cl. ......................... 363/17; 363/56.05; 363/25

(58) Field of Classification Search ................... 363/17, 363/56.05, 56.02, 24, 25
See application file for complete search history.

(56) References Cited

U.S. PATENT DOCUMENTS 5,414,609 A * 5/1995 Levran et al. ................. 363/17
7,106,605 B2 9/2006 Chen et al.

* cited by examiner

*Primary Examiner*—Shawn Riley
(74) *Attorney, Agent, or Firm*—Ingrassia, Fisher & Lorenz, P.C.

(57) ABSTRACT

A DC-to-DC converter and associated methods are provided for controlling the discharge of snubber capacitances during a light/no load buck mode of operation. An operating method for a DC-to-DC converter detects conditions corresponding to a light/no load buck mode of operation, and, in response to the detection of that mode, controls the states of a first switch, a second switch, a first switched diode element, a second switched diode element, a third switched diode element, and a fourth switched diode element to facilitate discharging of a first capacitance element and a second capacitance element through a secondary winding of a transformer.

19 Claims, 1 Drawing Sheet

SNUBBER CAPACITOR RESETTING IN A DC-TO-DC CONVERTER

TECHNICAL FIELD

The subject matter described herein generally relates to DC-to-DC converters, and more particularly relates to DC-to-DC converters with reduced voltage overshoot and reduced switching loss.

BACKGROUND

A DC-to-DC converter receives one DC voltage as an input and generates another DC voltage as an output. Many DC-to-DC converters function by applying a DC voltage across an inductor or transformer for a short period of time, resulting in energy storage, followed by removal or switching out of the applied DC voltage, which causes the stored energy to be transferred to the output. The timing of the switching of the DC-to-DC converter is controlled to regulate the output voltage as necessary. When operating in a boost mode, the DC-to-DC converter generates an output voltage that is higher than the input voltage. When operating in the buck mode, the DC-to-DC converter generates an output voltage that is less than or equal to the input voltage.

Although the prior art contains many different DC-to-DC converter configurations, the DC-to-DC converter disclosed in U.S. Pat. No. 7,106,605 is representative. This particular DC-to-DC converter uses snubber capacitors across two of its output diodes. During operation of this DC-to-DC converter, the energy stored in these snubber capacitors may result in undesirable switching loss.

BRIEF SUMMARY

An embodiment of a DC-to-DC converter includes a first low node and a second low node for a DC input voltage, a first high node and a second high node for a DC output voltage, a transformer having a primary winding and a secondary winding, a first switch coupled between a first end of the primary winding and the second low node, a second switch coupled between a second end of the primary winding and the second low node, a first switched diode element coupled between the first high node and a first end of the secondary winding, a second switched diode element coupled between the first high node and a second end of the secondary winding, a third switched diode element coupled between the first end of the secondary winding and the second high node, and a fourth switched diode element coupled between the second end of the secondary winding and the second high node. The DC-to-DC converter also includes a first capacitance element coupled between the first high node and the second end of the secondary winding, and a second capacitance element coupled between the second end of the secondary winding and the second high node. The DC-to-DC converter also includes a switch controller coupled to the first switch, the second switch, the first switched diode element, the second switched diode element, the third switched diode element, and the fourth switched diode element. The switch controller is configured to control discharging of the first capacitance element and the second capacitance element through the secondary winding during a buck mode of operation for the DC-to-DC converter.

A method of controlling a DC-to-DC converter is also provided, where the DC-to-DC converter includes a first switch coupled between a first end of a primary transformer winding and a low node, a second switch coupled between a second end of the primary transformer winding and the low node, a first switched diode coupled between a first end of a secondary transformer winding and a first high node, a second switched diode coupled between a second end of the secondary transformer winding and the first high node, a third switched diode coupled between the first end of the secondary transformer winding and a second high node, a fourth switched diode coupled between the second end of the secondary transformer winding and the second high node, a first capacitance element in parallel with the second switched diode, and a second capacitance element in parallel with the fourth switched diode. The method involves detecting conditions corresponding to a light/no load buck mode of operation for the DC-to-DC converter, and in response to the detecting step, controlling the states of the first switch, the second switch, the first switched diode, the second switched diode, the third switched diode, and the fourth switched diode to facilitate discharging of the first capacitance element and the second capacitance element through the secondary winding.

An embodiment of a method of controlling a DC-to-DC converter during a buck mode of operation is also provided. The DC-to-DC converter includes a first switch coupled between a first end of a primary transformer winding and a low node, a second switch coupled between a second end of the primary transformer winding and the low node, a first switched diode coupled between a first end of a secondary transformer winding and a first high node, a second switched diode coupled between a second end of the secondary transformer winding and the first high node, a third switched diode coupled between the first end of the secondary transformer winding and a second high node, a fourth switched diode coupled between the second end of the secondary transformer winding and the second high node, a first capacitance element in parallel with the second switched diode, and a second capacitance element in parallel with the fourth switched diode. The method involves: at the beginning of a first discharge period, closing the first switch to enable discharging of the first capacitance element and the second capacitance element through the secondary winding; during the first discharge period, maintaining the first switch in its closed state, maintaining the second switch in its closed state, maintaining the first switched diode in its shorted state, maintaining the second switched diode in its diode state, maintaining the third switched diode in its diode state, and maintaining the fourth switched diode in its diode state; and at the end of the first discharge period, switching the second switched diode to its shorted state.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWINGS

At least one embodiment of the present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of data transmission protocols and that the system described herein is merely one suitable example.

For the sake of brevity, conventional techniques related to DC-to-DC conversion, transistor-based switches, diode bridges, switch controllers, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the subject matter.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

Figure 2:
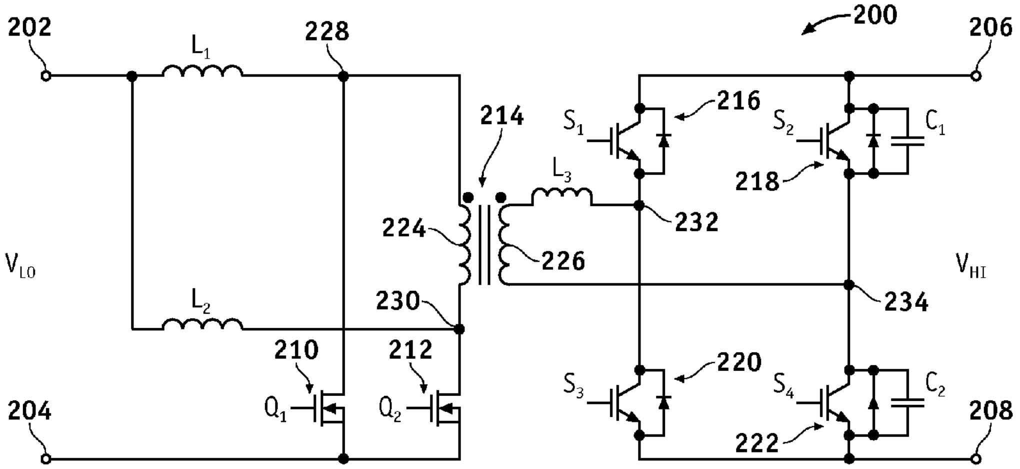
FIG. 2 is a circuit diagram of an embodiment of a DC-to-DC converter.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 2 depicts one possible arrangement of elements, additional intervening elements, devices, features, or components may be present in an embodiment of the depicted subject matter.

Figure 1:
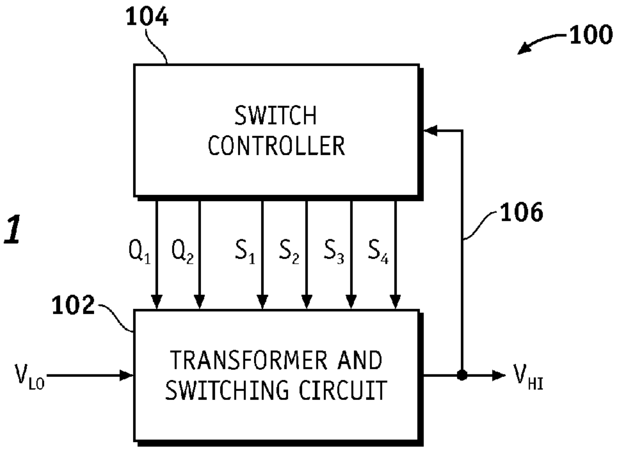
FIG. 1 is a schematic representation of an embodiment of a DC-to-DC converter.

FIG. 1 is a schematic representation of an embodiment of a DC-to-DC converter 100. DC-to-DC converter 100 generally includes a transformer and switching circuit 102 and a switch controller 104 coupled to transformer and switching circuit 102. Transformer and switching circuit 102 is suitably configured to receive a DC voltage ($V_{LO}$) and generate a DC voltage ($V_{HI}$) in response to $V_{LO}$. DC-to-DC converter 100 can operate in a bidirectional manner to convert a relatively low voltage to a relatively high voltage (boost mode) or to convert a relatively high voltage to a relatively low voltage (buck mode).

In a typical application suitable for use with an electric or hybrid electric vehicle, $V_{LO}$ is approximately 10-12 volts, and $V_{HI}$ is approximately 250-350 volts (for the boost mode of operation). As described in more detail below with reference to FIG. 2, transformer and switching circuit 102 includes various electrical components that are arranged in an appropriate topology and configuration. Such electrical components may include, without limitation: inductance elements; transistor-based switches; a transformer; capacitance elements; and conductive traces, interconnects, and/or nodes. Transformer and switching circuit 102 receives a number of switch control signals from switch controller 104. For consistency with FIG. 2, these switch control signals are labeled $Q_1$, $Q_2$, $S_1$, $S_2$, $S_3$, and $S_4$, and each switch control signal controls the state of its respective switch component. For this embodiment, the control signals $Q_1$ and $Q_2$ correspond to a first input switch and a second input switch of transformer and switching circuit 102. A relatively high level for $Q_1$ or $Q_2$ causes the respective switch to close (i.e., short), while a relatively low level for $Q_1$ or $Q_2$ causes the respective switch to open. For this embodiment, the control signals $S_1$, $S_2$, $S_3$, and $S_4$ correspond to four switched diode elements of transformer and switching circuit 102. A relatively high level for $S_1$, $S_2$, $S_3$, or $S_4$ causes the respective switched diode element to function as a short, while a relatively low level for $S_1$, $S_2$, $S_3$, or $S_4$ causes the respective switched diode element to function as a diode.

Switch controller 104 is suitably configured to generate the switch control signals $Q_1$, $Q_2$, $S_1$, $S_2$, $S_3$, and $S_4$ during operation of DC-to-DC converter 100. Switch controller 104 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

In practice, switch controller 104 monitors output conditions (represented by the feedback path 106 in FIG. 1) to determine the switching timing and switching patterns for transformer and switching circuit 102. In this regard, switch controller 104 can monitor the relatively high $V_{HI}$ voltage itself and/or the associated current to detect the desired operating mode for DC-to-DC converter 100. For this embodiment, switch controller 104 can detect conditions corresponding to (or indicative of) a boost mode of operation or a buck mode of operation. Moreover, switch controller 104 is suitably configured to detect a light load or no load condition, i.e., where little or no current is being consumed by the load associated with $V_{HI}$. In particular, switch controller 104 can detect conditions corresponding to a light/no load buck mode of operation for DC-to-DC converter 100. In response to the detection of such a light/no load buck mode of operation, switch controller 104 controls transformer and switching circuit 102 such that it functions in a buck mode, while also controlling discharging of snubber capacitance elements to reduce voltage overshooting and switching loss.

FIG. 2 is a circuit diagram of an embodiment of a DC-to-DC converter 200 (for simplicity, the associated switch controller is not shown in FIG. 2). The circuit depicted in FIG. 2 may be used in the context of DC-to-DC converter 100 (FIG. 1). This embodiment of DC-to-DC converter 200 includes, without limitation: a first low node 202; a second low node 204; a first high node 206; a second high node 208; a first inductance element (labeled L1); a second inductance element (labeled L2); a first switch 210; a second switch 212; a transformer 214; a first switched diode element 216; a second switched diode element 218; a third switched diode element 220; a fourth switched diode element 222; a first capacitance element (labeled C1); and a second capacitance element (labeled C2). Transformer 214 includes a primary winding 224 and a cooperating secondary winding 226. In FIG. 2, the components on the side of primary winding 224 may be considered to be an input (or output) circuit of DC-to-DC converter 200, and the components on the side of secondary winding 226 may be considered to be an output (or input) circuit of DC-to-DC converter 200.

The relatively low DC voltage ($V_{LO}$) is defined across first low node 202 and second low node 204, and the relatively high DC voltage ($V_{HI}$) is defined across first high node 206 and second high node 208. As mentioned above, $V_{HI}$ is generated by DC-to-DC converter 200 in response to $V_{LO}$. Inductance element L1 is coupled between first low node 202 and a node 228 that corresponds to a first end of primary winding 224. For the illustrated embodiment, inductance element L1 is directly connected between first low node 202 and node 228. Inductance element L2 is coupled between first low node 202 and a node 230 that corresponds to a second end of primary winding 224. For the illustrated embodiment, inductance element L2 is directly connected between first low node 202 and node 230. The amount of inductance provided by inductance elements L1 and L2 will vary from one implementation to another. For a typical deployment in an electric or hybrid electric traction system, each of the inductance elements L1 and L2 has an inductance within the range of about 5.0 μH.

First switch 210 is coupled between node 228 and second low node 204, and second switch 212 is coupled between node 230 and second low node 204. For the illustrated embodiment, first switch 210 is directly connected between node 228 and second low node 204, and second switch 212 is directly connected between node 230 and second low node 204. Although FIG. 2 depicts first switch 210 and second switch 212 as N-type MOSFET devices, an implementation of DC-to-DC converter 200 may use other transistor-based switches in this context.

The transistor gate of first switch 210 receives the switch control signal $Q_1$, and the transistor gate of second switch 212 receives the switch control signal $Q_2$ (see FIG. 1). For this particular embodiment, a relatively high level for switch control signal $Q_1$ causes first switch 210 to close, effectively shorting node 228 and second low node 204 together, while a relatively low level for switch control signal $Q_1$ causes first switch 210 to open, effectively creating an open circuit between node 228 and second low node 204. Second switch 212 is similarly controlled by switch control signal $Q_2$.

First switched diode element 216 is coupled between first high node 206 and a node 232 that corresponds to a first end of secondary winding 226. For the illustrated embodiment, first switched diode element 216 is directly connected between first high node 206 and node 232. FIG. 2 depicts a leakage inductance (labeled L3) that represents the leakage inductance of secondary winding 226. For purposes of this description, leakage inductance L3 is considered to be an integral characteristic of secondary winding 226. This leakage inductance is relatively small compared to the inductance of inductance elements L1 and L2.

For this particular embodiment, first switched diode element 216 (and the other switched diode elements in DC-to-DC converter 200) includes a switch in parallel with a diode. The switch may be realized as a transistor-based switch, e.g., an NPN bipolar junction transistor (BJT) as shown in FIG. 2. Of course, an implementation of DC-to-DC converter 200 may use other transistor-based switches in this context. Here, the cathode of the diode is coupled to the collector of the BJT, and the anode of the diode is coupled to the emitter of the BJT. The base of the BJT of first switched diode element 216 receives the switch control signal $S_1$ (see FIG. 1). For this particular embodiment, a relatively high level for switch control signal $S_1$ causes the BJT switch to close, effectively shorting first high node 206 and node 232 together, while a relatively low level for switch control signal $S_1$ causes the BJT switch to open, effectively inserting the diode between first high node 206 and node 232 to prevent current flow across the diode from first high node 206 to node 232. Thus, depending upon the state of the switch control signal $S_1$, first switched diode element 216 will function as a diode or a short.

Second switched diode element 218 is coupled between first high node 206 and a node 234 that corresponds to a second end of secondary winding 226. For the illustrated embodiment, second switched diode element 218 is directly connected between first high node 206 and node 234. For this particular embodiment, second switched diode element 218 includes a switch in parallel with a diode. The switch may be realized as a transistor-based switch, e.g., a BJT as shown in FIG. 2. Of course, an implementation of DC-to-DC converter 200 may use other transistor-based switches in this context. Here, the cathode of the diode is coupled to the collector of the BJT, and the anode of the diode is coupled to the emitter of the BJT. The base of the BJT of second switched diode element 218 receives the switch control signal $S_2$ (see FIG. 1). For this particular embodiment, a relatively high level for switch control signal $S_2$ causes the BJT switch to close, effectively shorting first high node 206 and node 234 together, while a relatively low level for switch control signal $S_2$ causes the BJT switch to open, effectively inserting the diode between first high node 206 and node 234 to prevent current flow across the diode from first high node 206 to node 234. Thus, depending upon the state of the switch control signal $S_2$, second switched diode element 218 will function as a diode or a short.

Third switched diode element 220 is coupled between node 232 and second high node 208. For the illustrated embodiment, third switched diode element 220 is directly connected between node 232 and second high node 208. For this particular embodiment, third switched diode element 220 includes a switch in parallel with a diode. The switch may be realized as a transistor-based switch, e.g., a BJT as shown in FIG. 2. Of course, an implementation of DC-to-DC converter 200 may use other transistor-based switches in this context. Here, the cathode of the diode is coupled to the collector of the BJT, and the anode of the diode is coupled to the emitter of the BJT. The base of the BJT of third switched diode element 220 receives the switch control signal $S_3$ (see FIG. 1). For this particular embodiment, a relatively high level for switch control signal $S_3$ causes the BJT switch to close, effectively shorting node 232 and second high node 208 together, while a relatively low level for switch control signal $S_3$ causes the BJT switch to open, effectively inserting the diode between node 232 and second high node 208 to prevent current flow across the diode from node 232 to second high node 208. Thus, depending upon the state of the switch control signal $S_3$, third switched diode element 220 will function as a diode or a short.

Fourth switched diode element 222 is coupled between node 234 and second high node 208. For the illustrated embodiment, fourth switched diode element 222 is directly connected between node 234 and second high node 208. For this particular embodiment, fourth switched diode element 222 includes a switch in parallel with a diode. The switch may be realized as a transistor-based switch, e.g., a BJT as shown in FIG. 2. Of course, an implementation of DC-to-DC converter 200 may use other transistor-based switches in this context. Here, the cathode of the diode is coupled to the collector of the BJT, and the anode of the diode is coupled to the emitter of the BJT. The base of the BJT of fourth switched diode element 222 receives the switch control signal $S_4$ (see FIG. 1). For this particular embodiment, a relatively high level for switch control signal $S_4$ causes the BJT switch to close, effectively shorting node 234 and second high node 208 together, while a relatively low level for switch control signal $S_4$ causes the BJT switch to open, effectively inserting the diode between node 234 and second high node 208 to prevent current flow across the diode from node 234 to second high node 208. Thus, depending upon the state of the switch control signal $S_4$, fourth switched diode element 222 will function as a diode or a short.

First capacitance element C1 is coupled between first high node 206 and node 234. In other words, first capacitance element C1 is in parallel with second switched diode element 218. In the illustrated embodiment, first capacitance element C1 is directly connected between first high node 206 and node 234. Similarly, second capacitance element C2 is coupled between node 234 and second high node 208. In other words, second capacitance element C2 is in parallel with fourth switched diode element 222. In the illustrated embodiment, second capacitance element C1 is directly connected between node 234 and second high node 208. The amount of capacitance provided by capacitance elements C1 and C2 will vary from one implementation to another. For a typical deployment in an electric or hybrid electric traction system, each of the capacitance elements C1 and C2 has a capacitance within the range of about 0.01 to about 0.10 μF.

Referring again to FIG. 1, switch controller 104 is suitably configured to generate switch control signals $Q_1$, $Q_2$, $S_1$, $S_2$, $S_3$, and $S_4$ in accordance with desired switching patterns to support the operation of DC-to-DC converter 200. In this regard, switch controller 104 is coupled to first switch 210, second switch 212, first switched diode element 216, second switched diode element 218, third switched diode element 220, and fourth switched diode element 222 in a manner that accommodates the delivery of switch control signals $Q_1$, $Q_2$, $S_1$, $S_2$, $S_3$, and $S_4$ to their respective switching components. When DC-to-DC converter 200 is operating in the boost mode, switch controller 104 controls and regulates the boosting of a relatively low DC voltage to a relatively high DC voltage. When DC-to-DC converter 200 is operating in the buck mode, switch controller 104 controls and regulates the reduction of a relatively high DC voltage to a relatively low DC voltage. As described in more detail below, switch controller 104 is also suitably configured to support a light/no load buck mode of operation, during which switch controller 104 controls discharging of first capacitance element C1 and second capacitance element C2 through secondary winding 226. In practice, switch controller 104 is suitably configured to regulate storage and release of inductive energy (that is associated with first input inductance element L1 and second input inductance element L2) as needed by selectively activating the switching components under its control.

DC-to-DC converter 200 utilizes first capacitance element C1 and second capacitance element C2 in different operating modes. In the boost mode of operation, second switched diode element 218 and fourth switched diode element 222 are switched off, i.e., they are both set to function as diodes. For a light/no load condition during the boost mode of operation, first switched diode element 216, third switched diode element 220, first capacitance element C1, and second capacitance element C2 form a half bridge circuit that provides a low reverse energy flow to keep the DC output voltage regulated. During the boost mode of operation, capacitance element C1 and capacitance element C2 also provide overshoot protection for first switch 210 and second switch 212.

In the buck mode of operation, first capacitance element C1 and second capacitance element C2 provide soft switching for second switched diode element 218 and for fourth switched diode element 222. Notably, at light and no load conditions, first capacitance element C1 and second capacitance element C2 are reset (i.e., at least partially discharged) to avoid high loss on second switched diode element 218 and fourth switched diode element 222. To this end, the control technique described herein resets first capacitance element C1 and second capacitance element C2 using first switch 210 and second switch 212 to effectively short transformer 214 during a discharge period while first switched diode element 216 or third switched diode element 220 is shorted. The shorting of transformer 214 provides a current path to charge and discharge first capacitance element C1 and second capacitance element C2 through leakage inductance L3 while first switched diode element 216 or third switched diode element 220 is shorted. The transformer leakage inductance L3 limits the charge and discharge current during this resetting process. The additional energy in leakage inductance L3 during this resetting process will be returned to generate the DC output voltage when first switched diode element 216 or third switched diode element 220 is switched off (i.e., is set to function as a diode).

Figure 3:
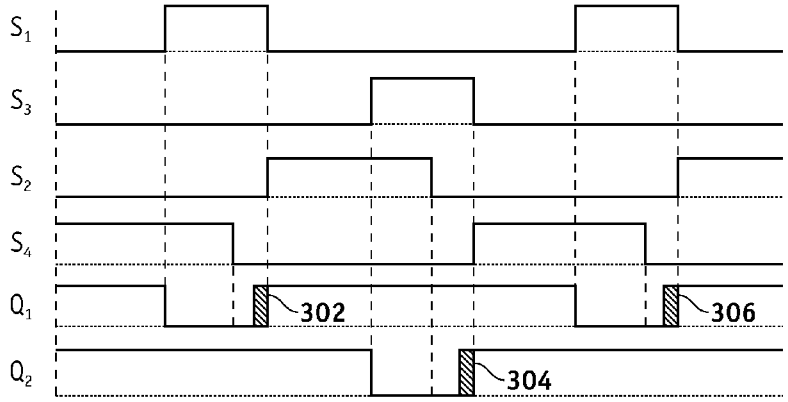
FIG. 3 is a switch timing diagram corresponding to the DC-to-DC converter shown in FIG. 2 operating in a light/no load buck mode.

The capacitor resetting methodology will be described below with reference to FIG. 3, which is a switch timing diagram corresponding to DC-to-DC converter 200 operating in a light/no load buck mode. FIG. 3 depicts the switch control signals for DC-to-DC converter 200 (switch control signals $Q_1$, $Q_2$, $S_1$, $S_2$, $S_3$, and $S_4$) on a common horizontal time axis. When a switch control signal is high, the respective switching component is closed; when a switch control signal is low, the respective switching component is open. In this regard, for each of the switched diode elements, the closed state represents a state where the respective switched diode element is set to function as a short, and the open state represents a state where the respective switched diode element is set to function as a diode.

FIG. 3 generally depicts the switch timing utilized to support the light/no load buck mode of operation. The actual switching periods, open/closed switch durations, and other timing parameters will vary from one implementation to another, depending upon factors such as the rise/fall time of the transistors, parasitic capacitances in the circuit, the load being driven, and the like. In one deployment suitable for use with a traction system of an electric or hybrid electric vehicle, the switching periods are on the order of 100 nanoseconds. Three discharge states and corresponding discharge periods are depicted in FIG. 3; in practice, the switching pattern can be repeated as needed throughout the light/no load buck mode. The leftmost shaded region represents a first discharge state 302, the centered shaded region represents a second discharge state 304, and the rightmost shaded region represents a third discharge state 306. For this embodiment, first discharge state 302 and third discharge state 306 each corresponds to a respective period of time during which: first switch 210 is closed; second switch 212 is closed; first switched diode element 216 is set to function as a short; second switched diode element 218 is set to function as a diode; third switched diode element 220 is set to function as a diode; and fourth switched diode element is set to function as a diode. At the beginning of the first discharge period (and at the beginning of the third discharge period) switch controller 104 closes first switch 210 to enable discharging of first capacitance element C1 and second capacitance element C2 through secondary winding 226. The switched components are maintained in their respective states for the duration of the first discharge state 302 and for the duration of the third discharge state 306. At the end of the first discharge period (and at the end of the third discharge period) switch controller 104 switches second switched diode element 218 to its shorted state.

For this embodiment, second discharge state corresponds to a period of time during which: first switch 210 is closed; second switch 212 is closed; first switched diode element 216 is set to function as a diode; second switched diode element 218 is set to function as a diode; third switched diode element 220 is set to function as a short; and fourth switched diode element 222 is set to function as a diode. At the beginning of the second discharge period switch controller 104 closes second switch 212 to enable discharging of first capacitance element C1 and second capacitance element C2 through secondary winding 226. The switched components are maintained in their respective states for the duration of the second discharge state 304. At the end of the second discharge period switch controller 104 switches fourth switched diode element 222 to its shorted state.

Switch controller 104 establishes a pre-discharge state immediately prior to first discharge state 302. As shown in FIG. 3, this pre-discharge state corresponds to a period of time during which: first switch 210 is open; second switch 212 is closed; first switched diode element 216 is set to function as a short; second switched diode element 218 is set to function as a diode; third switched diode element 220 is set to function as a diode; and fourth switched diode element 222 is set to function as a diode. The end of this pre-discharge state corresponds to the beginning of first discharge state 302, i.e., when first switch 210 transitions from its open state to its closed state. An equivalent pre-discharge state occurs immediately prior to third discharge state 306.

Switch controller 104 establishes a post-discharge state immediately following first discharge state 302. As depicted in FIG. 3, this post-discharge state corresponds to a period of time during which: first switch 210 is closed; second switch 212 is closed; first switched diode element 216 is set to function as a diode; second switched diode element 218 is set to function as a short; third switched diode element 220 is set to function as a diode; and fourth switched diode element 222 is set to function as a diode. The beginning of this post-discharge state corresponds to the end of first discharge state 302, i.e., when first switched diode element 216 transitions from its shorted state to its diode state and when second switched diode element 218 transitions from its diode state to its shorted state. An equivalent post-discharge state occurs immediately following third discharge state 306.

Switch controller 104 also establishes a pre-discharge state immediately prior to second discharge state 304. As shown in FIG. 3, this pre-discharge state corresponds to a period of time during which: first switch 210 is closed; second switch 212 is open; first switched diode element 216 is set to function as a diode; second switched diode element 218 is set to function as a diode; third switched diode element 220 is set to function as a short; and fourth switched diode element 222 is set to function as a diode. The end of this pre-discharge state corresponds to the beginning of second discharge state 304, i.e., when second switch 212 transitions from its open state to its closed state.

Switch controller 104 also establishes a post-discharge state immediately following second discharge state 304. As depicted in FIG. 3, this post-discharge state corresponds to a period of time during which: first switch 210 is closed; second switch 212 is closed; first switched diode element 216 is set to function as a diode; second switched diode element 218 is set to function as a diode; third switched diode element 220 is set to function as a diode; and fourth switched diode element 222 is set to function as a short. The beginning of this post-discharge state corresponds to the end of second discharge state 304, i.e., when third switched diode element 220 transitions from its shorted state to its diode state and when fourth switched diode element 222 transitions from its diode state to its shorted state.

The capacitor resetting procedure and switching technique described above allows first capacitance element C1 and second capacitance element C2 to discharge through transformer 226 (the shorting of first switch 210 and second switch 212 is reflected onto secondary winding 226 to effectively establish a direct conductive path from node 234 to the end of leakage inductance L3). More specifically, during first discharge state 302 first capacitance element C1 can discharge through secondary winding 226 via the shorted path created by first switched diode element 216. When second switched diode element 218 is switched to its shorted state a moment later, first capacitance element C1 has already been discharged, which eliminates switching loss through second switched diode element 218. Similarly, during second discharge state 304 second capacitance element C2 can discharge through secondary winding 226 via the shorted path created by third switched diode element 220. When fourth switched diode element 222 is switched to its shorted state a moment later, second capacitance element C2 has already been discharged, which eliminates switching loss through fourth switched diode element 222. In contrast, a traditional approach that discharges capacitors through second switched diode element 218 and fourth switched diode element 222 is inefficient and results in high loss.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A DC-to-DC converter comprising:

a first low node and a second low node for a low DC voltage;

a first high node and a second high node for a high DC voltage;

a transformer having a primary winding and a secondary winding;

a first switch coupled between a first end of the primary winding and the second low node;

a second switch coupled between a second end of the primary winding and the second low node;

a first switched diode element coupled between the first high node and a first end of the secondary winding;

a second switched diode element coupled between the first high node and a second end of the secondary winding;

a third switched diode element coupled between the first end of the secondary winding and the second high node;

a fourth switched diode element coupled between the second end of the secondary winding and the second high node;

a first capacitance element coupled between the first high node and the second end of the secondary winding;

a second capacitance element coupled between the second end of the secondary winding and the second high node; and a switch controller coupled to the first switch, the second switch, the first switched diode element, the second switched diode element, the third switched diode element, and the fourth switched diode element, the switch controller being configured to control discharging of the first capacitance element and the second capacitance element through the secondary winding during a buck mode of operation for the DC-to-DC converter.

2. The DC-to-DC converter of claim 1, further comprising:

a first inductance element coupled between the first low node and the first end of the primary winding; and a second inductance element coupled between the first low node and the second end of the primary winding.

3. The DC-to-DC converter of claim 2, wherein the switch controller is configured to regulate storage and release of inductive energy associated with the first inductance element and the second inductance element by controlled activation of the first switch and the second switch.

4. The DC-to-DC converter of claim 1, wherein the switch controller is configured to control discharging of the first capacitance element and the second capacitance element through a leakage inductance of the transformer.

5. The DC-to-DC converter of claim 1, wherein during the buck mode of operation the switch controller is configured to establish a discharge state during which the first switch is closed, the second switch is closed, the first switched diode element is set to function as a short, the second switched diode element is set to function as a diode, the third switched diode element is set to function as a diode, and the fourth switched diode element is set to function as a diode.

6. The DC-to-DC converter of claim 5, wherein during the buck mode of operation the switch controller is configured to establish a pre-discharge state immediately prior to the discharge state, during which the first switch is open, the second switch is closed, the first switched diode element is set to function as a short, the second switched diode element is set to function as a diode, the third switched diode element is set to function as a diode, and the fourth switched diode element is set to function as a diode.

7. The DC-to-DC converter of claim 5, wherein during the buck mode of operation the switch controller is configured to establish a post-discharge state immediately following the discharge state, during which the first switch is closed, the second switch is closed, the first switched diode element is set to function as a diode, the second switched diode element is set to function as a short, the third switched diode element is set to function as a diode, and the fourth switched diode element is set to function as a diode.

8. The DC-to-DC converter of claim 1, wherein during the buck mode of operation the switch controller is configured to establish a discharge state during which the first switch is closed, the second switch is closed, the first switched diode element is set to function as a diode, the second switched diode element is set to function as a diode, the third switched diode element is set to function as a short, and the fourth switched diode element is set to function as a diode.

9. The DC-to-DC converter of claim 8, wherein during the buck mode of operation the switch controller is configured to establish a pre-discharge state immediately prior to the discharge state, during which the first switch is closed, the second switch is open, the first switched diode element is set to function as a diode, the second switched diode element is set to function as a diode, the third switched diode element is set to function as a short, and the fourth switched diode element is set to function as a diode.

10. The DC-to-DC converter of claim 8, wherein during the buck mode of operation the switch controller is configured to establish a post-discharge state immediately following the discharge state, during which the first switch is closed, the second switch is closed, the first switched diode element is set to function as a diode, the second switched diode element is set to function as a diode, the third switched diode element is set to function as a diode, and the fourth switched diode element is set to function as a short.

11. A method of controlling a DC-to-DC converter comprising a first switch coupled between a first end of a primary transformer winding and a low node, a second switch coupled between a second end of the primary transformer winding and the low node, a first switched diode element coupled between a first end of a secondary transformer winding and a first high node, a second switched diode element coupled between a second end of the secondary transformer winding and the first high node, a third switched diode element coupled between the first end of the secondary transformer winding and a second high node, a fourth switched diode element coupled between the second end of the secondary transformer winding and the second high node, a first capacitance element in parallel with the second switched diode element, and a second capacitance element in parallel with the fourth switched diode element, the method comprising:

detecting conditions corresponding to a light/no load buck mode of operation for the DC-to-DC converter; and in response to the detecting step, controlling the states of the first switch, the second switch, the first switched diode element, the second switched diode element, the third switched diode element, and the fourth switched diode element to facilitate discharging of the first capacitance element and the second capacitance element through the secondary winding.

12. The method of claim 11, further comprising establishing a discharge state during which the first switch is closed, the second switch is closed, the first switched diode element is set to function as a short, the second switched diode element is set to function as a diode, the third switched diode element is set to function as a diode, and the fourth switched diode element is set to function as a diode.

13. The method of claim 12, further comprising establishing a pre-discharge state immediately prior to the discharge state, during which the first switch is open, the second switch is closed, the first switched diode element is set to function as a short, the second switched diode element is set to function as a diode, the third switched diode element is set to function as a diode, and the fourth switched diode element is set to function as a diode.

14. The method of claim 12, further comprising establishing a post-discharge state immediately following the discharge state, during which the first switch is closed, the second switch is closed, the first switched diode element is set to function as a diode, the second switched diode element is set to function as a short, the third switched diode element is set to function as a diode, and the fourth switched diode element is set to function as a diode.

15. The method of claim 11, further comprising establishing a discharge state during which the first switch is closed, the second switch is closed, the first switched diode element is set to function as a diode, the second switched diode element is set to function as a diode, the third switched diode element is set to function as a short, and the fourth switched diode element is set to function as a diode.

16. The method of claim 15, further comprising establishing a pre-discharge state immediately prior to the discharge state, during which the first switch is closed, the second switch is open, the first switched diode element is set to function as a diode, the second switched diode element is set to function as a diode, the third switched diode element is set to function as a short, and the fourth switched diode element is set to function as a diode.

17. The method of claim 15, further comprising establishing a post-discharge state immediately following the discharge state, during which the first switch is closed, the second switch is closed, the first switched diode element is set to function as a diode, the second switched diode element is set to function as a diode, the third switched diode element is set to function as a diode, and the fourth switched diode element is set to function as a short.

18. A method of controlling a DC-to-DC converter during a buck mode of operation, the DC-to-DC converter comprising a first switch coupled between a first end of a primary transformer winding and a low node, a second switch coupled between a second end of the primary transformer winding and the low node, a first switched diode element coupled between a first end of a secondary transformer winding and a first high node, a second switched diode element coupled between a second end of the secondary transformer winding and the first high node, a third switched diode element coupled between the first end of the secondary transformer winding and a second high node, a fourth switched diode element coupled between the second end of the secondary transformer winding and the second high node, a first capacitance element in parallel with the second switched diode element, and a second capacitance element in parallel with the fourth switched diode element, the method comprising:

at the beginning of a first discharge period, closing the first switch to enable discharging of the first capacitance element and the second capacitance element through the secondary winding;

during the first discharge period, maintaining the first switch in its closed state, maintaining the second switch in its closed state, maintaining the first switched diode element in its shorted state, maintaining the second switched diode element in its diode state, maintaining the third switched diode element in its diode state, and maintaining the fourth switched diode element in its diode state; and at the end of the first discharge period, switching the second switched diode element to its shorted state.

19. The method of claim 18, further comprising:

at the beginning of a second discharge period, closing the second switch to enable discharging of the first capacitance element and the second capacitance element through the secondary winding;

during the second discharge period, maintaining the first switch in its closed state, maintaining the second switch in its closed state, maintaining the first switched diode element in its diode state, maintaining the second switched diode element in its diode state, maintaining the third switched diode element in its shorted state, and maintaining the fourth switched diode element in its diode state; and at the end of the second discharge period, switching the fourth switched diode element to its shorted state.

* * * * *